United States Patent [19]

Fry et al.

[11] Patent Number: 4,962,149

[45] Date of Patent: Oct. 9, 1990

[54] MODIFIED CHLORINATED POLYOLEFINS

[75] Inventors: Slaton E. Fry, Batesville; David W. Magouyrk, Locust Grove; Allen J. Blankenship, Batesville, all of Ark.; Paul J. Greene, Kingsport, Tenn.

[73] Assignee: Eastman Kodak Company, Rochester, N.Y.

[21] Appl. No.: 432,632

[22] Filed: Nov. 7, 1989

[51] Int. Cl.$^5$ ..................... C08L 39/00; C08F 265/10
[52] U.S. Cl. .................................. 524/555; 524/567; 524/582; 525/282; 525/334.1; 525/380
[58] Field of Search ..................... 524/555, 582, 567; 525/334.1, 380, 282

[56] References Cited

U.S. PATENT DOCUMENTS 3,412,078 11/1968 Hagermeyer, Jr. et al. .

FOREIGN PATENT DOCUMENTS 0061889 10/1982 European Pat. Off. .

Primary Examiner—Joseph L. Schofer
Assistant Examiner—Mark D. Sweet
Attorney, Agent, or Firm—Charles R. Martin; William P. Heath, Jr.

[57] ABSTRACT

Chemically-modified, chlorinated, hydroxyimidized polyolefins are used as stir-in additives to produce a paint having improved film appearance, adhesion and campatibility.

4 Claims, No Drawings

MODIFIED CHLORINATED POLYOLEFINS

This invention relates to modified chlorinated polyolefins which are useful as a stir-in additive for paints. The modified paints exhibit desirable film appearance, adhesion, and compatibility.

Chlorinated, carboxyl group-containing polyolefins are useful as primers or as coatings for a variety of substrates, including polyolefin substrates. While such materials may have good properties of toughness, flexibility and chemical resistance when used in coating applications, film appearance and/or adhesion and/or compatibility of such coatings to the desired substrate is frequently poor, and consequently conditions such as solvent contact, high humidity and the like cause release of the coating from the substrate. In addition to poor properties, the use of chlorinated, carboxyl group-containing polyolefins in the form of a primer necessitate the additional step of applying the primer to the surface to be painted prior to painting. It would, therefore, be an advance in the art to provide modified chlorinated polyolefins which can be stirred into the paint to enhance the film appearance, adhesion, and compatibility of the paint.

In accordance with the present invention, we have discovered that chlorinated, carboxyl-containing polyolefins can be modified to produce polymers which can be used as a stir-in additive for paints which exhibit greatly improved film appearance, adhesion, and compatibility, even when exposed to a variety of solvents and/or high humidity conditions.

In accordance with one embodiment of this invention, there is provided a composition comprising an admixture of a paint and a polyolefin of at least one olefin selected from the group consisting of $C_{10}$ olefins; wherein said polyolefin contains in the range of about 10 up to 40 weight % chlorine; wherein said polyolefin further contains in the range of about 10 up to 30 hydroxyimide moieties per polymer chain; wherein said hydroxyimide has the structural formula:

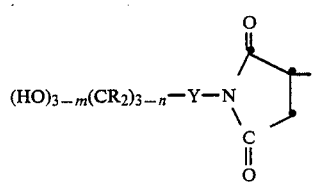

wherein m=0, 1 or 2; n=0, 1, 2 or 3; R is H or a hydrocarbyl radical having in the range of 1 up to 20 carbon atoms; and Y is a hydrocarbyl moiety having in the range of 1 up to 20 carbon atoms.

In accordance with another embodiment of this invention, there is provided a method for improving the adhesion of paints to a substrate comprising admixing with the paint prior to application a hydroxyimidized, chlorinated polyolefin composition having the structure:

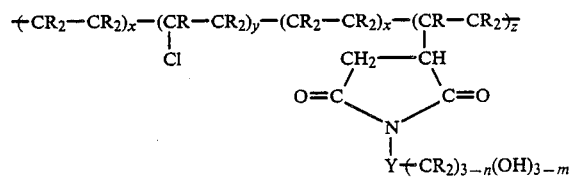

wherein m=0, 1 or 2; n=0, 1, 2 or 3; R is H or a hydrocarbyl radical having in the range of 1 up to 20 carbon atoms; and Y is a hydrocarbyl moiety having in the range of 1 up to 20 carbon atoms; wherein each of x, y, and z can vary in the range of about 0 up to 1,000 so that the resulting polymer has a number average molecular weight in the range of about 2,000 up to 40,000, and wherein the ratio of x:y can vary from about 1:1 up to about 4:1, the ratio of x:z can vary from about 20:1 up to about 50:1, and the ratio of y:z can vary from about 10:1 up to about 20:1.

The chlorinated, carboxyl group-containing polyolefins useful in this invention are similar to the chlorinated, carboxyl group-containing polyolefins disclosed in Ser. No. 196,659 filed May 20, 1988.

The chlorinated, carboxyl group-containing polyolefins useful in this invention can be prepared by contacting a polycarboxylated, chlorinated polyolefin having in the range of about 10 up to 40 weight percent chlorine and an acid number (expressed in terms of mg KOH/g of polymer) in the range of about 10 up to 75 with at least a stoichiometric amount (relative to the acid number of the polycarboxylated, chlorinated polyolefin) of at least one hydroxyamine having the structural formula:

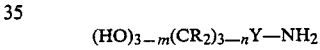

$$(HO)_{3-m}(CR_2)_{3-n}Y-NH_2$$

wherein m=0, 1 or 2; n=0, 1, 2 or 3; R is H or a hydrocarbyl radical having in the range of 1 up to 20 carbon atoms; and Y is a hydrocarbyl moiety, e.g., an alkylene or arylene moiety, having in the range of 1 up to 20 carbon atoms, under conditions suitable to form a hydroxyimidized, chlorinated polyolefin.

The carboxyl group containing polyolefin can be prepared, for example, by reacting low viscosity amorphous and crystalline polyolefins prepared, for example, from olefins containing at least 2 carbon atoms with an unsaturated polycarboxylic acid, anhydrides or esters thereof, preferably in the presence of free radicals.

Suitable polyolefins employed in the practice of the present invention are polymers prepared from one or more olefins having in the range of 2 up to 10 carbon atoms, and a number average molecular weight (as determined by gel permeation chromatography relative to polystyrene standards) in the range of about 2,000 up to 40,000. Preferred polyolefins have a number average molecular weight in the range of about 4,000 up to 20,000, with polyolefins having a number average molecular weight in the range of about 4,000 up to 12,000 being most preferred.

Preferred olefins from which are prepared the polyolefins employed in the practice of the invention are selected from the group consisting of:
ethylene
propylene,
1-butene,
cis-2-butene,
trans-2-butene, isobutylene,
1-pentene,
1-hexene,
1-octene,
and the like, as well as mixtures of any two or more thereof. Polymers or copolymers prepared primarily from ethylene and/or propylene are presently the most preferred polyolefins for use in the practice of the present invention.

One suitable homopolymeric or copolymeric low viscosity polyolefin can be prepared by thermally degrading conventional high molecular weight polyolefin prepared by conventional polymerization processes. These polyolefins are, for example, high, medium and low density polyethylene, crystalline polypropylene, amorphous polypropylene, polybutene-1, polypentene-1, ethylene/propylene copolymers and the like. For example, one suitable conventional polymer is the polypropylene prepared according to U.S. Pat. No. 3,412,078.

Thermal degradation of the conventional homopolymers or copolymers is accomplished by heating at elevated temperatures causing the polymer chain to rupture apparently at the points of chain branching of the polymeric material. The degree of degradation is controlled by reaction time and temperature to give a thermally degraded low molecular weight polymeric material having a melt viscosity range from about 100–5,000 cp. at 190° C. (ASTM-D1238-57T using 0.04±0.0002 inch orifice) and an inherent viscosity of about 0.1 to 0.5, measured in Tetralin at 145° C. By carefully controlling the time, temperature and agitation, a thermally degraded polyolefin of relatively narrower molecular weight range than the starting high molecular weight polymer can be obtained. The degradation is carried out at a temperature in the range of about 290° C. to about 425° C. These low viscosity polyolefins prepared by thermally degrading conventional high molecular weight polymers are not emulsifiable as such; but upon reaction with unsaturated polycarboxylic acids, anhydrides, or esters thereof, the acid number and saponification number are increased to a number greater than 15 to provide an emulsifiable material. If the acid number and the saponification number of polyolefins prepared in this manner are less than 15, the material is generally not emulsifiable.

Another suitable low viscosity polyolefin is prepared by polymerizing a suitable olefin to a melt viscosity of from about 100 to 5,000 cp as measured at 190° C (ASTM-D1238-57T using 0.04±0.002 inch orifice).

Those of skill in the art are aware of numerous other methods which can be employed to prepare suitable low viscosity polyolefins for use in the practice of the present invention.

The low viscosity polyolefins are reacted with unsaturated polycarboxylic acids, anhydrides or esters thereof at temperatures generally less than about 350° C., preferably from about 150°–300° C. in the presence of a free radical source which can be used as a catalyst. By using a free radical source, the temperature of reaction is reduced.

Suitable free radical sources are, for example, peroxides such as ditertiarybutyl peroxide, tertiarybutyl hydroperoxide, cumene hydroperoxide, or azo compounds, such as azobis(isobutyronitrile), or irradiation sources. Suitable irradiation sources include, for example, those from cobalt, uranium, thorium, and the like and ultraviolet light.

Those of skill in the art can readily determine suitable amounts of organic unsaturated polycarboxylic acid, ester or anhydride thereof to employ in order to achieve product having the desired acid number. Broadly, in the range of about 0.5% up to 15% by weight, based on the weight of low viscosity polyolefin, can be used in the practice of the present invention. Preferably, about 1% to 10% organic unsaturated polycarboxylic acid, anhydride or esters thereof, based on the weight of the low viscosity polyolefin will be used in the practice of the present invention.

The amount of peroxide or free radical agent used is generally quite low being of the order of about 0.01% to about 0.5% based on the weight of the low viscosity polyolefin.

The reaction can be carried out either in a batchwise or in a continuous manner with contact times in the order of about 10 minutes to about 2 hours.

Suitable unsaturated polycarboxylic acids and anhydrides are, for example, maleic acid, maleic anhydride, fumaric acid, citraconic anhydride, aconitic anhydride and itaconic anhydride. Suitable esters are, for example, the half or full esters derived from methyl, ethyl, dimethyl maleate, dimethyl fumarate, methyl ethyl maleate, dibutyl maleate, dipropyl maleate, and the like, or those compounds which form these compounds at elevated reaction temperatures such as citric acid, for example.

These acid modified low molecular weight polyolefin compositions have a melt viscosity of 100–5,000 centipoise at 190° C. and an acid number in the range of about 10 up to 75, preferably in the range of about 20–50. It has been observed in the practice of the present invention that the melt viscosity of the product increases slightly upon modification of the polyolefin with the polycarboxylic moiety. This increase in melt viscosity may be due to a slight degree of crosslinking or to copolymerization of the wax material with the polycarboxylic moiety.

One method for the determination of the acid number is as follows: Weigh approximately one gram of the sample into a 250-mL alkali-resistant Erlenmeyer flask and add 50 mL distilled xylene, 25 mL isopropyl alcohol and 2 mL deionized water. Titrate potentiometrically with standardized 0.10 N KOH in ethyl alcohol.

Calculation:

$$\frac{\text{mL KOH} \times \text{NKOH} \times 56.1}{\text{g Sample}} = \text{Acid Number}$$

The unreacted unsaturated polycarboxylic acid can be separated from the reaction mixture by purging the reaction mixture with an inert gas while the melt temperature is between 200° and 300° C. After the unreacted unsaturated polycarboxylic acid has been removed, the modified polyolefin can be further purified by standard techniques, such as for example, vacuum stripping, solvent extraction, or dissolving in an aqueous medium and isolating by removing the solvent or water.

The chlorination procedure is conveniently carried out in solution and may be carried out either batchwise or continuously. The solvent used should be one which is inert to elemental chlorine and to hydrogen chloride, which is the principal by-product of the reaction. Suitable solvents include halogenated aromatics and halogenated aliphatics, such as, for example, chlorobenzene and carbon tetrachloride. The solvent employed is preferably of a high degree of purity and contain very low amounts, less than about 100 ppm, of components which yield ash on burning. The solvent employed is also preferably colorless and low boiling for easy removal from the polymer product. It is noted that the ash content of the chlorinated, polyolefin product is preferably less than about 0.01% by weight of the polymer.

The concentration of carboxyl group containing polyolefin in the chlorination solvent may be varied, but will generally not exceed about 50% by weight, with the preferred range being in the range of about 15% up to 25% by weight. Concentrations greater than about 50% provide solutions of high viscosity which are difficult to agitate adequately.

The chlorination temperature may also be varied, but at about 160° C. the chlorinated polymer becomes susceptible to degradation. At a chlorination temperature of <50° C. the reaction is extremely slow. Generally the preferred temperature range for the chlorination is from about 50° to about 120° C. In some instances it is desirable that the reaction be carried out under a moderate chlorine pressure in order to increase the solubility of the chlorine in the liquid phase. Generally, the reaction is carried out merely by adding chlorine gas into a well-stirred solution of the polyolefin dissolved in a suitable solvent.

The progress of the chlorination reaction can be followed in a number of ways. One method for such determination is to periodically isolate a sample of the chlorinated polyolefin and determine the density of this polymer. The chlorine content is directly related to density and can be determined from a graph showing the amount of chlorine versus the increase in viscosity. Alternative ways to determine the degree of chlorination is to (1) determine the viscosity of the reaction mixture, or (2) measure the quantity of hydrogen chloride liberated in the course of the reaction. The presently preferred method of determining the degree of chlorination is to remove the solvent from an aliquot of sample, then subjecting the sample to Schoniger combustion and measuring the total HCl released by potentiometric titration with standardized silver nitrate solution.

When the desired chlorine content is reached, the polymeric product may be isolated by any of a number of methods well known in the art. The reaction solvent may be removed, for example, by stripping with a hot gas or by vacuum distillation.

The chlorinated, carboxyl group-containing polyolefin is chlorinated until the desired chlorine content is obtained. The chlorinated carboxyl group containing polyolefin for primer use should have a chlorine content of from about 10 to about 40 weight percent, preferably about 25 to 35, and, most preferably, about 30 weight percent.

In addition to the chlorinated polyolefins, the primer coating solutions can have incorporated therein typical additives such as stabilizers, fillers, pigments, plasticizers, resinous modifiers, solvents, and the like.

In accordance with the present invention, the chlorinated, carboxyl group containing polyolefins prepared as described above are contacted with at least one hydroxyamine having the structural formula:

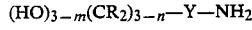

wherein $m=0$, 1 or 2; $n=0$, 1, 2 or 3; R is H or a hydrocarbyl radical having in the range of 1 up to 20 carbon atoms; and Y is a hydrocarbyl moiety, e.g., an alkylene or arylene moiety, having in the range of 1 up to 20 carbon atoms, under conditions suitable to form a hydroxyimidized, chlorinated polyolefin.

Hydroxyamine compounds contemplated for use in the practice of the present invention include:
tris(hydroxymethyl)methyl amine,
para-aminophenol,
2-amino-2-methyl-1-propanol,
3-amino-1-propanol
ethanolamine,
2,2-dimethyl-3-amino-1-propanol,
and the like, as well as mixtures of any two or more thereof.

Contacting of the chlorinated, carboxyl group containing polyolefin compounds with hydroxyamine compounds can be carried out under a variety of conditions. Typically, temperatures in the range of about 50° up to about 150° C. for contact times in the range of about 0.1 up to 6 hours are suitable to obtain substantially complete conversion of the carboxyl groups of the polymer chain to hydroxyimide moieties.

The resulting hydroxyimidized, chlorinated polyolefins comprise a polyolefin of at least one olefin selected from the group consisting of $C_2$ up to $C_{10}$ olefins; wherein said polyolefin contains in the range of about 10 up to 40 weight % chlorine; wherein said polyolefin further contains in the range of about 10 up to 30 hydroxyimide moieties per polymer chain; wherein said hydroxyimide has the structural formula:

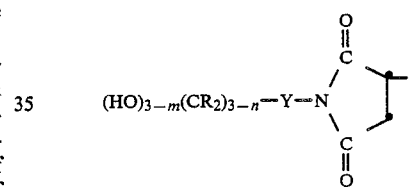

wherein $m=0$, 1 or 2; $n=0$, 1, 2 or 3; R is H or a hydrocarbyl radical having in the range of 1 up to 20 carbon atoms; and Y is a hydrocarbyl moiety having in the range of 1 up to 20 carbon atoms. Preferred hydroxy amines from which these hydroxyimides are derived are tris(hydroxymethyl)methyl amine,
para-aminophenol,
2-amino-2-methyl-1-propanol,
3-amino-1-propanol,
ethanolamine,
2,2-dimethyl-3-amino-1-propanol,
as well as mixtures of any two or more thereof.

The modified, chlorinated polyolefins of the present invention can also be described by reference to the following repeating units:

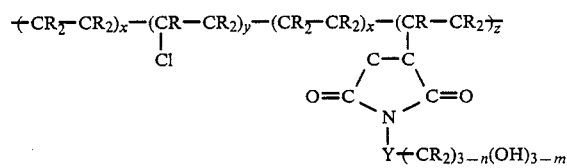

wherein $m=0$, 1 or 2; $n=0$, 1, 2 or 3; R is H or a hydrocarbyl radical having in the range of 1 up to 20 carbon atoms; and Y is a hydrocarbyl moiety having in the range of 1 up to 20 carbon atoms; wherein each of x, y, and z can vary in the range of about 0 up to 1,000 so that the resulting polymer has a number average molecular weight in the range of about 2,000 up to 40,000, and wherein the ratio of x:y can vary from about 1:1 up to about 4:1, the ratio of x:z can vary from about 20:1 up to about 50:1, and the ratio of y:z can vary from about 10:1 up to about 20:1. Preferred structures include those where the moiety

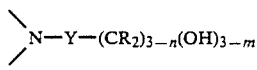

is selected from the group consisting of:

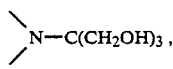

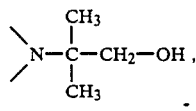

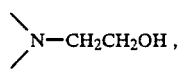

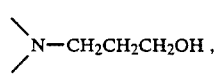

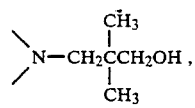

as well as mixtures of any two or more thereof.

The paint to which the chlorinated, carboxyl group-containing polyolefins is added can comprise any paint which is compatible with the chlorinated, carboxyl group-containing polyolefins in the sense the chlorinated, carboxyl group-containing polyolefins forms an admixture with the chlorinated, carboxyl group-containing polyolefins and also compatible in the sense it is a suitable paint for the substrate to be painted. Acrylic enamel and urethane enamel are particularly suitable.

The composition of the invention is formed by preparing an admixture of the paint and chlorinated, carboxyl group-containing polyolefins. Preferably the admixture is formed by simply slowly adding the chlorinated, carboxyl group-containing polyolefins into the paint while the paint is stirred in a field location immediately prior to application. After the admixture is formed, the paint is applied by conventional means.

The relative amount of the chlorinated, carboxyl group-containing polyolefins to the paint is not critical. Broadly, the amount of chlorinated, carboxyl group-containing polyolefins can be in the range of 0.5% to 10%, preferably 1.0% to 6.0% and most preferably 3.0% to 5.0%, based on the weight of the chlorinated, carboxyl group-containing polyolefins and paint.

In another embodiment of this invention, there is provided a method for improving the adhesion of paints to a substrate comprising admixing with the paint prior to application a hydroxyimidized, chlorinated polyolefin composition having the structure:

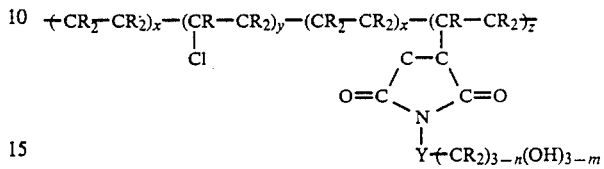

wherein m=0, 1 or 2; n=0, 1, 2 or 3; R is H or a hydrocarbyl radical having in the range of 1 up to 20 carbon atoms; and Y is a hydrocarbyl moiety having in the range of 1 up to 20 carbon atoms; wherein each of x, y, and z can vary in the range of about 0 up to 1,000 so that the resulting polymer has a number average molecular weight in the range of about 2,000 up to 40,000, and wherein the ratio of x:y can vary from about 1:1 up to about 4:1, the ratio of x:z can vary from about 20:1 up to about 50:1, and the ratio of y:z can vary from about 10:1 up to about 20:1.

The chlorinated, carboxyl-containing polyolefins can be used as stir-in additives for paints used on various types of substrates. Such substrates include polyolefins such as polyethylene and polypropylene, and also metal surfaces such as copper wire, aluminum foil, steel, galvanized metal, and the like.

This invention can be further illustrated by the following examples of preferred embodiments thereof, although it will be understood that these examples are included merely for purposes of illustration and are not intended to limit the scope of the invention.

To illustrate practice of this invention, a 25% xylene solution of a chlorinated polyolefin with 30% chlorine and an acid number of 25, was charged to a 100-ml flask and heated to 50°-60° C. Various hydroxyamines were then added to prepare a large number of chlorinated, carboxyl group-containing polyolefins. The batches were cooled to room temperature and added by stirring to a number of unpigmented paints. The amount of chlorinated, carboxyl group-containing polyolefins was 5 weight percent, based on the weight of the paint. Propylene plaques were then painted and the paint was allowed to dry. The appearance of the paint, the adhesion of the paint, and the compatibility was then measured. The appearance of the paint was measured by drawing a paint onto a glass slide and allowing the paint to dry. The film was visually observed for cloudiness, haze, or precipitants. The adhesion of the film was measured by cross-hatching the painted plaque with a razor blade and then applying Permacel tape to the hatching and smartly removing the tape. The % adhesion is measured by the amount of painted surface that is left on the plaque. A small bead of paint was placed on a glass slide to measure compatibility of the resins by the clarity of the film formed.

The results of these tests are presented in Tables I and II.

TABLE I

Adhesion, compatibility and film appearance tests using a commercial available acrylic enamel.

| Polymer Modifier | Film Appearance | % Adhesion | Compatibility |
|---|---|---|---|
| Ethanolamine | Good | 100 | C |
| n-Propanolamine | Good | 90 | C |
| 2-(2-Hydroxyethyl) Ethylenediamine | Poor | 50 | I |
| 2-Amino-2-methyl-1-propanol | Good | 95 | C |
| p-Aminophenol | Poor | 80 | I |
| — | Good | 80 | C |
| — | Poor | 100 | I |
| — | Good | 0 | — |

I = Incompatible
C = Compatible

TABLE II

Adhesion, compatibility and film appearance tests using a commercial availability urethane enamel.

| Polymer Modifier | Film Appearance | % Adhesion | Compatibility |
|---|---|---|---|
| Ethanolamine | Good | 100 | C |
| n-Propanolamine | Good | 100 | C |
| 2-(2-Hydroxyethyl) Ethylenediamine | Poor | NT | I |
| (3,3'Aminopropyl)amine | Poor | NT | I |
| 2(2-Aminoethoxy)ethanol | Good | 50 | C |
| 2-Amino-2-methyl-1-propanol | Good | 85 | C |
| — | Good | 80 | C |
| — | Poor | 100 | I |
| p-Aminophenol | Poor | 90 | I |
| — | Good | 0 | — |

I = Incompatible
C = Compatible

We claim:

1. A composition of a paint and a polyolefin having repeating units of the structure:

$$-(CR_2-CR_2)_x-(CR-CR_2)_y-(CR_2-CR_2)_x-(CR-CR_2)_z-$$
$$\underset{Cl}{|} \quad \underset{\underset{Y-(CR_2)_{3-n}(OH)_{3-m}}{|}}{\underset{N}{\overset{C-C}{\underset{||}{O=C\diagup \diagdown C=O}}}}$$

wherein m=0, 1 or 2; n=0, 1, 2 or 3; R is H or a hydrocarbyl radical having in the range of 1 up to 20 carbon atoms; and Y is a hydrocarbyl moiety having in the range of 1 up to 20 carbon atoms; wherein each of x, y, and z can vary in the range of about 0 up to 1,000 so that the resulting polymer has a number average molecular weight in the range of about 2,000 up to 40,000, and wherein the ratio of x:y can vary from about 1:1 up to about 4:1, the ratio of x:z can vary from about 20:1 up to about 50:1, and the ratio of y:z can vary from about 10:1 up to about 20:1.

2. The composition of claim 1 wherein said polyolefin is a polymer of propylene having a number average molecular weight in the range of about 2,000 up to 40,000.

3. The composition of claim 2 wherein said polymer of propylene contains in the range of about 25 up to 35 weight percent chlorine and has in the range of about 15 up to 25 hydroxyimide moieties per polymer chain.

4. The composition of claim 1 wherein said hydroxylimide is contributed by a hydroxyamine selected from the group consisting of:
tris(hydroxymethyl)methyl amine,
para-aminophenol,
2-amino-2-methyl-1propanol,
3-amino-1-propanol,
ethanolamine,
2,2-dimethyl-3-amino-1-propanol, as well as mixtures of any two or more thereof.

* * * * *